ANISOTROPIC SUPERCONDUCTOR

Filed Feb. 2, 1966 2 Sheets-Sheet 1

INVENTORS
EUGENE REVOLINSKY
DONALD J. BEERNTSEN
GLEN A. SPIERING
BY Donald C. McLaughlin
ATTORNEY INVENTORS
EUGENE REVOLINSKY
DONALD J. BEERNTSEN
GLEN A. SPIERING
BY Forest C. Sexton
ATTORNEY

United States Patent Office 3,406,362

Patented Oct. 15, 1968

3,406,362

ANISOTROPIC SUPERCONDUCTOR

Eugene Revolinsky, West Allis, Wis., Donald J. Beerntsen, Youngstown, N.Y., and Glen A Spiering, Milwaukee, Wis., assignors to Allis-Chalmers Manufacturing Company, Milwaukee, Wis.

Continuation-in-part of application Ser. No. 349,524, Feb. 13, 1964. This application Feb. 2, 1966, Ser. No. 533,744

3 Claims. (Cl. 335—216)

ABSTRACT OF THE DISCLOSURE

A superconducting composition of matter consisting essentially of a solid solution of niobium diselenide with a chemical composition within the range of $Nb_{1.05}$ to $NbSe_{2.0}$, and having a transition temperature within the range of 2.4 to 7.0° K. And an isotropic superconducting composition of matter consisting essentially of a single hexagonal crystal of the above composition having more liberal current and magnetic field limitations when the current is passed therethrough in a direction parallel to the C-axis of the crystal.

This application is a continuation-in-part of application Serial No. 349,524 filed February 13, 1964, and application Serial No. 349,524 is a continuation-in-part of application Serial No. 308,002 filed September 10, 1963, both now abandoned.

This invention relates generally to superconductors. More specifically this invention relates to new and improved superconducting materials and to methods for producing and using these superconducting materials.

Superconductivity is perhaps best described as being a thermodynamic state which, at some temperature approaching absolute zero, certain compositions of matter, primarily metals, alloys, and intermetallic compounds, achieve a state characterized by perfect diamagnetism and zero electrical resistivity. Perfect diamagnetism implies the exclusion of magnetic flux from superconductors and a condition of zero electrical resistivity (or infinite conductivity) is selfexplanatory.

Superconductivity was first discovered in 1911 by Kamerlingh Onnes. Onnes was studying resistivity at cryogenic temperatures when he found that the resistivity of mercury suddenly dropped to zero at 4.2° K. Since Onnes' initial discovery, some 20 to 25 other elements and hundreds of alloys and intermetallic compounds have been found to be superconductors.

The transition temperature (often called the critical temperature) is the temperature at which resistance drops to zero. The resistance transition can be very sharp in pure, annealed materials but often takes place over several tenths of a degree Kelvin in impure and/or deformed materials. All known superconductors have transition temperatures which fall within a range of from a fraction of a degree of absolute zero to 18.2° K. This highest known transition temperature of 18.2° K. is for the intermetallic compound, $Nb_3Sn$.

Although zero electrical resistivity is the most apparent property of a superconductor, the criterion of perfect diamagnetism is more crucial and from it the idea of zero resistivity follows. Perfect diamagnetism implies zero permeability, $\mu$. Permeability is defined as $B/H$ where B is the magnetic flux density at a point in a material or a medium and H is the magnetic field intensity necessary to produce that flux density. Now, if $\mu$ is to be zero, B must be zero because H is finite.

$$B=H+4\pi J$$

where J is the intensity of magnetization. Therefore $$H=-4\pi J$$

for a superconductor. In words, the magnetic field H induces in the superconductor a field equal to itself but opposite in sign. It does this by penetrating the material in a very thin layer at the surface. In this thin surface layer a current is generated whose associated magnetic field is equal to H but opposite in sign. This field of intensity $-4\pi J$ is sufficient to prevent further entry of the flux into the interior. In order for $-4\pi J$ to *exactly* equal H the current responsible for it must be a supercurrent, i.e., there must be zero resistivity. If the external field, H, increases, the screening current increases also until at some critical value, $H_c$, the material reverts to its normal state, the current decays due to resistance and the external flux enters. At the transition temperature, $T_c$, any finite field is sufficient to make the material normal; therefore, at $T_c$, $H_c$ equals zero. At temperatures less than $T_c$, $H_c$ is greater than zero and reaches a theoretical maximum value as T approaches absolute zero. A superconductor can be made to revert to the normal state at any temperature below its critical temperature if a sufficiently intense magnetic field is applied. For most superconductors the critical field, $H_c$, varies as the square of the absolute temperature divided by the square of the critical temperature in the following manner.

$$H_c=H_o[1-(T/T_c)^2]$$

where $H_0$ is the critical field at absolute zero. For some high field superconductors $H_c$ appears to vary linearly with temperature but to some extent this is due to the experimental difficulty of having to produce a sufficiently high field in the 100,000–400,000 gauss range to demonstrate nonlinearity.

The magnetic field associated with a supercurrent induced by an electric field has the same deleterious effect on the superconductive state as does an external field. For this reason many known superconductors cannot be used to carry extremely large supercurrents because the associated fields are greater than the critical fields.

Although this self-destroying effect is the basic principle utilized in some superconductor applications, this effect helped to discourage some earlier developments in the art because the early known superconductors, principally elements, have low critical fields which severely limit the currents that could be carried. For example, critical field values for some of the early discovered superconductors are from 300 to 1000 gauss even at temperatures within a fraction of a degree of the absolute zero of temperature. Within the past decade however, the discoveries of many new superconductors having critical fields on the order of 60,000, 100,000 and possibly even 800,000 gauss have stimulated research and development to the point where commercial acceptance is sure to follow.

The superconductors having these high critical field values are all either intermetallic compounds or concentrated alloys and almost all are characterized by being quite hard and brittle. The superconductors having low critical fields are characterized by being rather soft and ductile since they are primarily elements and dilute alloys. This has resulted in classifying superconductors as being either "soft" superconductors, namely those of low critical fields, and "hard" superconductors being those of high critical field values.

Purity and crystalline irregularities of a superconductor may also greatly affect the critical field and thus greatly affect its current carrying capacity. Severe deformation may enable some superconductors to support much higher currents than possible when the superconductor is in the annealed condition. Accordingly, dislocations have been inferred to be the "filaments" which carry the superconductive current. In fact, it has been possible to deform some superconductors in such a way as to preferentially orient the dislocations in certain direction or plane so that the critical field or current carrying capacity is greatly enhanced in one or more given directions, but not in other directions. The methods used to achieve such anisotropic properties are too involved and complex to be given consideration here. It should be mentioned however, that for some superconductor applications it is desirable to have superconductors which possess such anisotropic properties.

Despite the great advancements, superconductors presently employed in the art have several physical or electrical characteristics which are of a major disadvantage in some areas of development. One of the disadvantages is that the really good superconductors, namely those with high transition temperatures and high critical fields, are extremely hard and brittle at even room temperatures so that fabrication and handling problems are of a serious nature. For example, in some superconductor applications it is desirable to produce a thin superconducting film deposit on a substrate. This is a difficult procedure which must be approached in a different manner for each material.

Another disadvantage lies in the area of anisotropic superconductors. As mentioned above, such anisotropic properties are affected only after extremely complex deforming operations. Any reversion of these anisotropic superconductors to the annealed state will destroy the anisotropy. And of course, any further unintended deformations could seriously affect it not destroy the anisotropy.

Upon consideration of these two basic problems, more problems resulting therefrom are realized. For example, since most of the preferred superconductors are quite brittle, ability to deform the crystals without fracturing may be a serious problem and thin superconducting sheets having anisotropic properties may be impossible to produce.

This invention is predicated upon our discovery that niobium diselenide, $NbSe_2$, and certain solid solutions thereof are improved superconducting materials which readily avoid the above mentioned problems. Our superconducting materials have a high degree of anisotropic properties without deformation. Furthermore, our superconductors have from 1 to 3 percent ductility, which is a substantial improvement over most other "hard" superconducting intermetallic compounds which have no measurable ductility. Our superconductors have a relatively high transition temperature, relatively high critical field limits, and are capable of being produced in thin films.

Accordingly, it is an object of this invention to provide new compositions of matter having improved superconducting properties and having relatively high transition temperatures and relatively high current capacities.

It is another object of this invention to provide new superconductors having natural anisotropic properties in the annealed state.

It is a further object of this invention to provide new superconductors having a substantial degree of ductility.

It is still another object of this invention to provide new superconductors capable of being produced in thin films possessing anisotropic properties.

It is still a further object of this invention to provide a method for producing these new and improved superconductors in various forms.

These and other objects and advantages as shall become apparent, are fulfilled by this invention as can be discerned from a careful consideration of the following detailed description when read in conjunction with the accompanying drawings in which.

Figure 1:
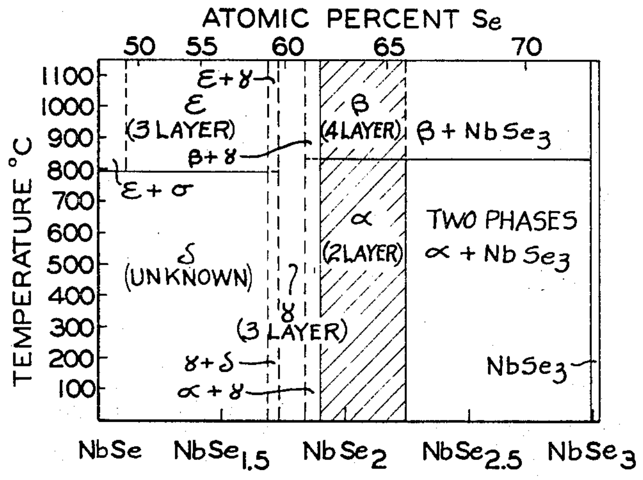
FIG. 1 is a partial phase diagram showing the regions of stability of the two superconducting intermetallic phases (shaded area)

Referring to the partial phase diagram of FIG. 1, the compositions found to be superconducting are those phases marked α and β. These are solid solution phases of niobium diselenide having niobium dissolved therein. Thus from the diagram it is seen that the composition ranges found to be superconducting range from $NbSe_{1.90}$ (or $Nb_{1.05}Se_2$) to $NbSe_{2.0}$.

The α phase is a hexagonal "two layer repeat" structure of the $NbS_2$ type ($a$=3.44 A, $c$=12.54 A). The unit cell consists of two layer packets weakly bonded to one another, with each layer packet containing a pair of close packed anion sheets arranged in such a way as to form trigonal prism holes which accommodate the cations. Stacking of the two layer packets places cations directly over cations on lines parallel to the $c$-axis of the hexagonal crystal. This stacking arrangement is of the $NbS_2$ type with the space group being $P6_3/mmc{-}D_{6}^{4}h$. Although this type of structure is generally well known, Table I below serves to further define the structure by atom parameters.

The β phase is a hexagonal "four layer repeat" structure of a new structure type ($a$=3.44 A., $c$=25.24 A.). The unit cell contains four layer packets of close packed anion sheets each again having trigonal prism cation coordination within the layer. Three of the four layer packets are stacked such that their cations lie along the same lines parallel to the $c$-axis. The fourth layer packet is placed such that its cations lie on a different set of lines parallel to the $c$-axis. The space group is $P\bar{6}m2$. The atom parameters for this new structure are further defined in Table II below.

TABLE I.—ATOM PARAMETERS FOR TWO LAYER STRUCTURE (ORIGIN AT $\bar{6}$m2)

| Atom | Space Group Notation | Hexagonal Coordinates x | y | z |
|---|---|---|---|---|
| Nb | 2 b $\bar{6}$m2 | 0 | 0 | ¼ |
| Se | 4 f 3m | ⅓ | ⅔ | 0.116 |

TABLE II.—ATOM PARAMETERS FOR NEW FOUR LAYER STRUCTURE (ORIGIN AT $\bar{6}$m2)

| Atom | Space Group Notation | Hexagonal Coordinates x | y | z |
|---|---|---|---|---|
| $Nb_1$ | 1 a $\bar{6}$m2 | 0 | 0 | 0 |
| $Nb_2$ | 1 e $\bar{6}$m2 | ⅔ | ⅓ | ½ |
| $Nb_3$ | 2 g 3m | 0 | 0 | .250 |
| $Se_1$ | 2 i 3m | ⅔ | ⅓ | .066 |
| $Se_2$ | 2 h 3m | ⅓ | ⅔ | .185 |
| $Se_3$ | 2 h 3m | ⅓ | ⅔ | .318 |
| $Se_4$ | 2 g 3m | 0 | 0 | .432 |

The two superconducting structures described above are quite different from the usual structures which favor superconductivity. In fact these are the first structures of this type found to be superconducting.

The four layer structure (β phase) is shown by the phase diagram as being a high temperature phase, with stability at temperatures above 850° C. The high temperature structure once formed, is quite easy to retain at lower temperatures. At temperatures below 850° C. the structure is probably metastable with respect to decomposition to the alpha structure. However, this metastability should in no way inhibit its use as a superconductor since the kinetics of transformation are probably immeasurably slow at room to liquid helium temperatures.

Figure 5:
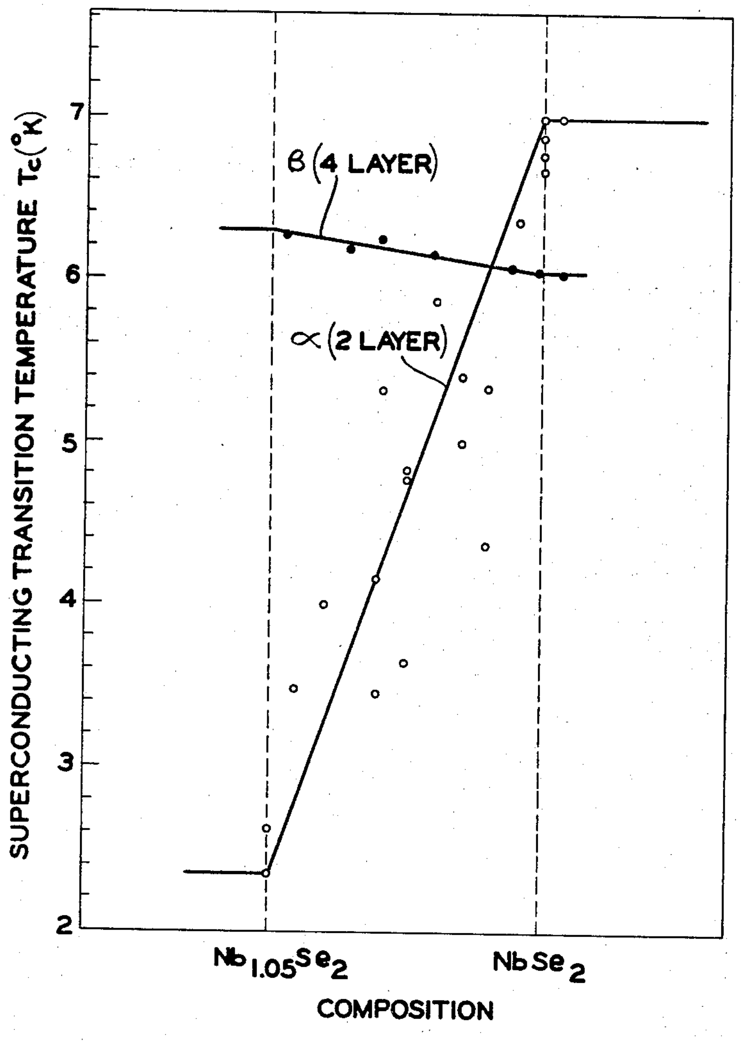
FIG. 5 is a graph showing the dependency of transformation temperature upon composition of the solid solution.

Both polycrystalline and single crystal forms have been prepared and shown to be superconducting. The transition temperature for various polycrystalline compositions of the two phases will vary between about 2.4 and 7.0° K. when measured by magnetic susceptibility techniques. The variation in transition temperature is due primarily to deviations in stoichiometry. We have shown that the variation in composition has a stronger influence on transition temperature for the two layer structure. Variations in composition of the four layer structure have only a slight effect upon transition temperature. These composition effects are readily apparent from FIG. 5. FIG. 5 shows that the transition temperature slightly increases from about 6.0 to about 6.30 as the samples become richer in niobium for the four layer structure. However, the transition temperature for the two layer structure varies from about 7.0° K. at $NbSe_2$ to about 2.4° K. at $Nb_{1.05}Se_2$.

Figure 2:
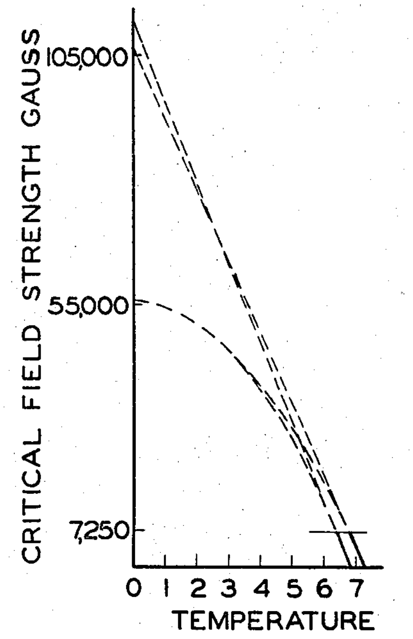
FIG. 2 is a graph showing critical field vs. temperature, part of which is measured (by resistance technique on single crystals) and part of which is extrapolated.

Referring to FIG. 2 a plot of critical field vs. temperature is shown for two representative single crystal samples. These two samples having transition temperatures of 6.8 and 7.25° K. at zero external field, had transition temperatures of 6.35 and 6.75° K. respectively in a 7,250 gauss magnetic field. These transition temperatures were determined by a resistance method which tended to give slightly higher results than obtained by the magnetic susceptibility method. Assuming a parabolic dependence of critical field, extrapolation years an $H_o$ value (critical field at 0° K.) of 55,000 gauss. On the other hand a linear extrapolation reveals an $H_o$ value of 90,000 gauss.

Most known superconductors have a parabolic dependency of critical field vs. temperature, while a few indicate a straight line dependency. Thus the above extrapolations should give reasonably accurate limits for the $H_o$ values. Accordingly, it can safely be said that single crystal samples of our superconductors will have $H_o$ values of at least 55,000 gauss, and our compositions can therefore be classified in the "hard" superconductor range.

Figures 3, 4:
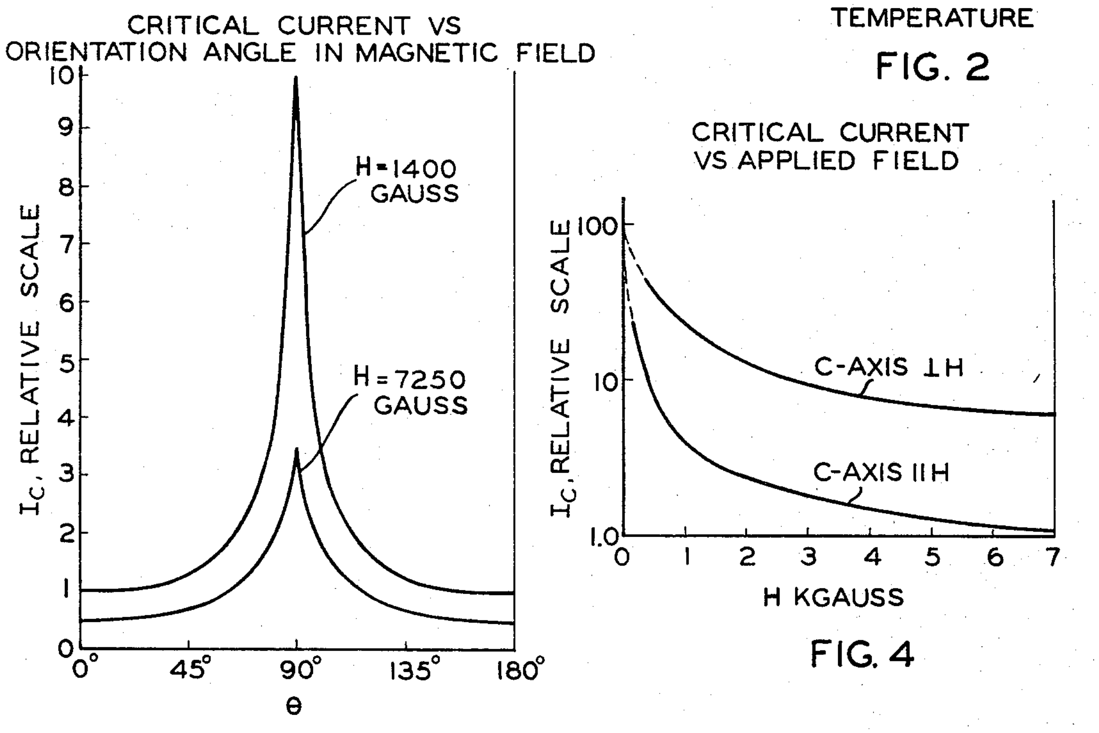
FIG. 3 is a graph showing critical current vs. orientation angle of the sample in the magnetic field which indicates the degree of anisotropy.
FIG. 4 is a graph showing critical current vs. applied field at perpendicular positions of the sample in the applied field.

Referring now to FIG. 3 a typical plot of critical current vs. angle theta is shown. Theta is defined as the angle between the *c*-axis of the single crystal and H, the vector which specifies the direction of the magnetic field. The plot shows two series of critical current measurements at 4.2° K., for the same single crystal, one at 1400 gauss and the other at 7,250 gauss applied field. With the applied field of 1400 gauss parallel to the *c*-axis (shown at 0° on the graph) a critical current of 150 amps/cm.$^2$ can be carried. However, as the crystal is rotated toward 90° the critical current begins to increase until a maximum critical current of 1500 amps/cm.$^2$ is achieved when the applied field of 1400 gauss is perpendicular to the *c*-axis. This represents a 10 fold increase in critical current. Critical current ratios of from 3 to as high as 13 have been observed at 1400 gauss for the two positions. The critical current is not a linear function of theta but rather peaks sharply at the optimum angle. Similarly in an applied field of 7,250 gauss, a critical current density of 70 amps/cm.$^2$ is typical with the field parallel to the *c*-axis, and increases to 500 amps/cm.$^2$ (7.5 fold increase) when the field is perpendicular (90°) to the *c*-axis. Such anisotropic properties have never before been realized except through severe and controlled deformation of superconducting material. It should be stressed that the above described anisotropic properties for our single crystal superconductors are properties in undeformed crystals in the annealed condition. However, it is possible that when soldering the voltage and current leads there may be a very slight amount of deformation of the crystal.

FIG. 4 is a plot of critical current vs. applied field at 4.2° K., for two different directions of the applied field.

The low field-high current portion of the curves have been dotted in as these values were extrapolated. Thus far, Joule heating in the indium-soldered resistance contacts has been the current limiting process rather than the field associated with the current. Measured current densities as high as 5,000 amp/cm.$^2$ have been achieved however. The true critical current density at zero applied field is probably somewhat higher. The lower curve of FIG. 4 shows how the critical current density decreases by roughly 100 times as the magnetic field is increased from 0 to 7,000 gauss in a direction parallel to the *c*-axis. The upper plot shows that with increasing field applied perpendicular to the *c*-axis, the critical current is only about twelve times lower at 7,000 gauss than at zero applied field.

PREPARATION

The polycrystalline material may be synthesized by sealing stoichiometric, or near stoichiometric amounts of the powdered elements in an evacuated quartz ampoule. Heating the sealed ampoule to a temperature in the 500–850° C. range will form the two layer polycrystalline structure. If on the other hand, the ampoule is heated to a range of 850 to 1000° C., the four layer structure will be formed. The holding time does not appear to be critical; however, a 72 hour holding time proved to be sufficient in all cases. If the reactant elements are relatively pure, then further purification treatments will not be necessary.

Upon heating the ampoule, the reaction proceeds with the selenium first melting. The molten selenium then combines with the solid niobium to form a black powderlike reaction product. Upon completion of the reaction, the quartz ampoules may be air quenched.

The single crystals may be prepared by vapor transport methods. This reaction basically involves the vaporization of a solid compound at a temperature $T_1$ by forming a volatile chemical intermediate. Then, utilizing the temperature dependence of the chemical equilibrium, the compound is reformed at a temperature $T_2$. The procedure involves sealing into an evacuated quartz ampoule a quantity of elemental iodine, and a stoichiometric ratio of the powdered elements nobium and selenium (or the polycrystalline material as produced above). The ampoule should then be placed in a gradient furnace with the reactants at one end of the ampoule at 900 to 1000° C. and the other end at 500 to 900° C. Transportation will take place from the hot to the cold end in from 75 to 100 hours. The reaction proceeds as follows: $NbSe_2$ (solid)$+5/2I_2$ (gas)$-NbI_5$ (gas)$+2Se$ (gas) hot end $NbI_5$ (gas)$-Nb$ (solid)$+5/2I_2$ (gas) cold end Nb (solid)$+2Se$ (gas)$-NbSe_2$ (solid) cold end.

The quantity of iodine used will be dependent upon the rate of transportation desired and the pressure capacity of the ampoule. Excessive quantities of iodine should be avoided since rapid transportation may result in poor crystal growth, and the partial pressure of the iodine vapors may be excessive enough to rupture the ampoule. Too small a quantity of iodine will delay the transport reaction. As a rule of thumb we have found that from 1 to 1000 milligrams of iodine per cubic centimeter of volume of the ampoule works quite satisfactorily.

The crystals grow in a thin platelike shape the plane of which is perpendicular to the *c*-axis.

A vapor reaction of this type is one of several methods which can be used to produce a thin single crystal film coating on an appropriate substrate.

To aid in a fuller understanding of this invention the following examples are given to show how the superconducting material may be produced. These examples, however, are meant only to be exemplary and should in no way limit the scope of this invention.

EXAMPLE I

A single crystal of the "two layer repeat" structure of the $NbS_2$ type was produced by preparing approximately ten grams of the elements in a stoichiometric ratio. This powder was mixed with 0.3 gram of iodine and placed in a quartz ampoule (11/16" I.D. x 15" long). The ampoule was then evacuated and placed in a gradient furnace. The end of the ampoule containing the powdered mixture was heated to about 900° C. and the other end heated to about 600 to 800° C. Within one hundred hours, single crystals were produced being platelike in shape and having the dimensions .003" x .1375 x .1375".

EXAMPLE II

A single crystal of the "four layer repeat" structure of the new structure type was produced by preparing approximately ten grams of the elements in a stoichiometric ratio. This powder was mixed with 0.3 gram of iodine and placed in a quartz ampoule (11/16" I.D. x 15" long). The ampoule was then evacuated and placed in a gradient furnace. The end of the ampoule containing the powdered mixture was heated to about 950° C. and the other end heated to about 800 to 900° C. Within one hundred hours, single crystals were produced being platelike in shape and having the dimensions .015" x .125" x .125".

EXAMPLE III

Polycrystalline material of the "two layer repeat" structure of the $NbS_2$ type was produced by sealing approximately five grams of the elements, weighed in stoichiometric proportions, in an evacuated quartz ampoule. The ampoule was placed in a furnace and heated to temperatures of 600–800° C. Within seventy-two hours, the reaction was complete and the ampoule was air quenched upon removal from the furnace. A homogeneous powderlike reaction product was produced.

EXAMPLE IV

Polycrystalline material of the "four layer repeat" structure of the new structure type was produced by preparing approximately five grams of the elements, weighed in the stoichiometric proportions, in an evacuated quartz ampoule. The ampoule was placed in a furnace and heated to temperatures of 850 to 1000° C. Within seventy-two hours, the reaction was complete and the ampoule was air quenched upon removal from the furnace. A homogeneous powderlike reaction product was produced.

The embodiments of the invention in which an exclusive property or privilege is claimed are defined as follows:

1. The method of conducting electricity with virtually zero electrical resistivity, the steps comprising maintaining a body consisting essentially of niobium diselenide at a temperature below the transition temperature of said body, the transition temperature of said body being within a range of from about 2.4 to 7.0 K.; and passing an electrical current through said body.

2. The method according to claim 1 wherein said body has a chemical composition within the range $Nb_{1.05}Se_{2.0}$ to $NbSe_{2.0}$.

3. The method according to claim 2 wherein said body is a single hexagonal crystal.

References Cited

UNITED STATES PATENTS

| | | | |
|---|---|---|---|
| 2,866,842 | 12/1958 | Matthias | 252—516 |
| 3,028,341 | 2/1962 | Rosi et al. | 252—518 |
| 3,145,125 | 8/1964 | Lyons | 148—175 |

OTHER REFERENCES

Bolton, Z. Electrochem. 13, (1907) p. 149.

Burton, "Superconductivity," U. of Toronto Press (1934), p. 54.

Seebold et al., J. Nuclear Materials, 3 pp., 260–266 (1961).

LEON D. ROSDOL, *Primary Examiner.*

J. D. WELSH, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,406,362 October 15, 1968

Eugene Revolinsky et al.

It is certified that error appears in the above identified patent and that said Letters Patent are hereby corrected as shown below:

Column 8, line 15, "7.0" should read -- $7.0^{\circ}$ --.

Signed and sealed this 3rd day of March 1970.

(SEAL)
Attest:

Edward M. Fletcher, Jr.
Attesting Officer

WILLIAM E. SCHUYLER, JR.
Commissioner of Patents